US011394538B2

(12) United States Patent
Ramirez et al.

(10) Patent No.: US 11,394,538 B2
(45) Date of Patent: Jul. 19, 2022

(54) SYSTEM AND METHOD FOR VERIFYING THE NO-LATER-THAN DATE-OF-EXISTENCE, DATA INTEGRITY, IDENTITY OF THE RECORDER, AND TIMESTAMP OF THE RECORDING FOR DIGITAL CONTENT

(71) Applicants: David Lee Anthony Ramirez, Apopka, FL (US); Alfonso Miguel Morales, Oviedo, FL (US)

(72) Inventors: David Lee Anthony Ramirez, Apopka, FL (US); Alfonso Miguel Morales, Oviedo, FL (US)

( * ) Notice: Subject to any disclaimer, the term of this patent is extended or adjusted under 35 U.S.C. 154(b) by 137 days.

(21) Appl. No.: 16/674,628

(22) Filed: Nov. 5, 2019

(65) Prior Publication Data

US 2021/0135862 A1    May 6, 2021

(51) Int. Cl.
*H04L 9/08* (2006.01)
*H04L 9/06* (2006.01)
(Continued)

(52) U.S. Cl.
CPC .......... *H04L 9/0861* (2013.01); *H04L 9/0643* (2013.01); *H04L 9/30* (2013.01); *H04L 9/3231* (2013.01); *H04L 9/3263* (2013.01)

(58) Field of Classification Search
CPC . H04L 9/08; H04L 9/0861; H04L 9/06; H04L 9/0643; H04L 9/30; H04L 9/3231;
(Continued)

(56) References Cited

U.S. PATENT DOCUMENTS 6,629,150 B1 * 9/2003 Huded .................... G06F 21/64
707/999.004
6,725,373 B2 * 4/2004 Carbajal ............... H04L 9/3247
713/176
(Continued)

FOREIGN PATENT DOCUMENTS

CN    109934585 A * 6/2019 ............. G06Q 20/38

OTHER PUBLICATIONS

Enhancing Security Of Agent-Oriented Techniques Programs Code Using Jar Files By Vivek Jaglan, Surjeet Dalal and Dr. S. Srinivasan pp. 6; Apr. 4, 2011.*
(Continued)

*Primary Examiner* — Jorge L Ortiz Criado
*Assistant Examiner* — Ali H. Cheema
(74) *Attorney, Agent, or Firm* — Paul Royal, Jr.; The Patent Guild (57) ABSTRACT

A system and method for recording and verifying the data integrity, identity of the recorder, and no-later-than date-of-existence for digital content of an arbitrary size is provided. The provided system and method employ blockchain technology to ensure immutability and accessibility of digital content state, digital content recorder identity, and timestamp of recording for the recorded digital content. The provided system and method also generate meta-data files associated with the recorded digital content that consist of a manifest file, a signature file, and a signature block file. The meta-data files are included into the digital content in order to facilitate the verification of the digital content against the records held in the blockchain.

2 Claims, 7 Drawing Sheets

(51) Int. Cl.
*H04L 9/30* (2006.01)
*H04L 9/32* (2006.01)

(58) Field of Classification Search
CPC ... H04L 9/3263; H04L 2209/38; G06F 16/00; G06F 16/1744; G06F 21/6218; G06F 2221/2107; G06F 2221/2141
USPC .......................................... 713/171, 176, 189
See application file for complete search history.

(56) References Cited

U.S. PATENT DOCUMENTS

| | | | | |
|---|---|---|---|---|
| 8,226,473 B2 * | 7/2012 | Gazdic | ................... | A63F 13/73 |
| | | | | 463/43 |
| 8,856,889 B2 * | 10/2014 | Alwar | ................... | G06F 9/5077 |
| | | | | 726/4 |
| 2006/0156010 A1 * | 7/2006 | Kim | ................ | G11B 20/00086 |
| | | | | 713/176 |
| 2008/0045342 A1 * | 2/2008 | Crowder, Jr. | ......... | G06F 21/575 |
| | | | | 463/42 |
| 2013/0024700 A1 * | 1/2013 | Peterson | ............... | H04L 69/329 |
| | | | | 713/189 |
| 2013/0326500 A1 * | 12/2013 | Park | ....................... | G06F 9/445 |
| | | | | 717/177 |
| 2017/0063552 A1 * | 3/2017 | Abt, Jr. | ................. | H04L 9/3247 |
| 2018/0191503 A1 * | 7/2018 | Alwar | .................... | G06Q 20/10 |
| 2018/0227293 A1 * | 8/2018 | Uhr | ..................... | G06Q 20/3821 |
| 2019/0172026 A1 * | 6/2019 | Vessenes | ............... | H04L 9/3247 |
| 2021/0092108 A1 * | 3/2021 | Jen | ........................ | G06F 21/602 |
| 2021/0135880 A1 * | 5/2021 | Cheng | ................... | H04L 9/3239 |

OTHER PUBLICATIONS

Java tool extensions for supporting multiple recommenders and distributed bundles By Marius Silaghi, Khalid Alhamed and Ryan Stansifer pp. 4; IEEE (Year: 2015).*
NeoTrust webpage link: https://neotrust.appspot.com/ By NeoWare Inc. (pp. 3); (Year: 2021).*

* cited by examiner

SYSTEM AND METHOD FOR VERIFYING THE NO-LATER-THAN DATE-OF-EXISTENCE, DATA INTEGRITY, IDENTITY OF THE RECORDER, AND TIMESTAMP OF THE RECORDING FOR DIGITAL CONTENT

BACKGROUND OF THE INVENTION

Field of the Invention

The disclosed subject matter relates to integrity verification, source verification, and time-of-existence verification of digital content.

BRIEF SUMMARY OF THE INVENTION

The present invention provides integrity verification, source verification, and time-of-existence verification of digital content. More particularly, the present invention presents system and method for verifying the no-later-than date-of-existence, data integrity, identity of the recorder, and timestamp of the recording for digital content is provided. The digital content may represent videos, computer code, images, certificates, audio, or any other digital file format. The provided system and method employ blockchain technology to ensure immutability and accessibility of digital content state, digital content recorder identity, and digital content record timestamp.

DETAILED DESCRIPTION

Figure 1:
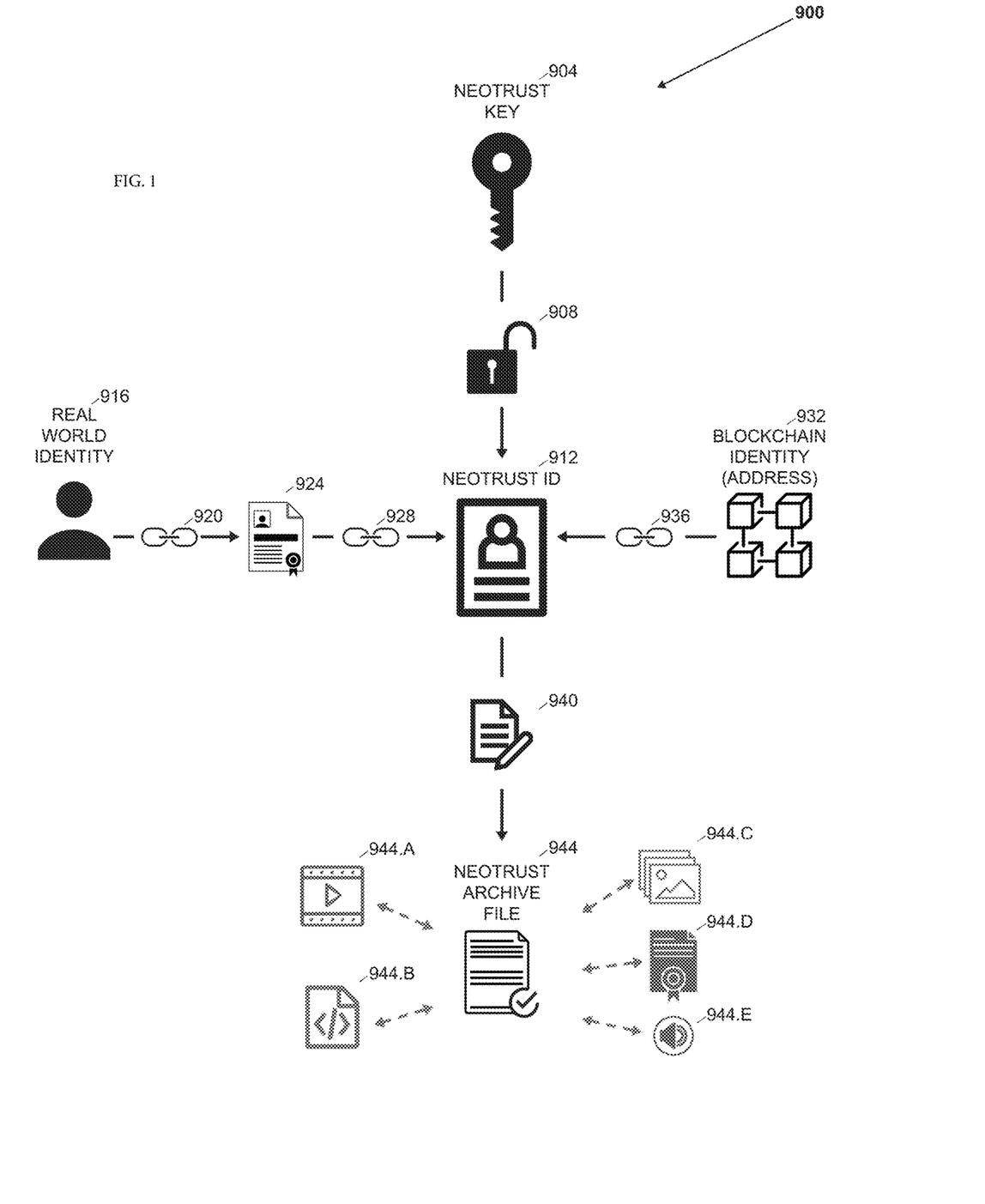
FIG. 1 presents an iconic view of the system and method.

The present invention presents a system and method for verifying the no-later-than date-of-existence, data integrity, identity 916 of the recorder, and timestamp of the recording for digital content is provided. The digital content may represent videos 944A, computer code 944B, images 944C, certificates 944D, audio 944E, or any other digital file format. The provided system and method employ blockchain technology to ensure immutability and accessibility of digital content state, digital content recorder identity 916, and digital content record timestamp.

To facilitate the verification of the identity 916 of the user creating and recording a NeoTrust archive file 944, it is necessary for each user that will be creating and recording NeoTrust archive files to obtain a NeoTrust ID 912.

The NeoTrust ID 912 is a secp256k1 cryptographic public/private key pair that serves to provide the functionality 932 for creating digital signatures (ie. digitally signing digital content digests with the private key). A "digest", in this sense, is a fixed length code that is outputted by a hash algorithm. A hash algorithm is a mathematical calculation that produces a unique digest dependent on the contents of a digital file. The hash algorithm works in such a way that any difference to the file contents, no matter how small, will produce a different digest.

In the instant method and system, digests are used to record and verify the state of a digital file. The NeoTrust ID 912 is also mathematically linked (which may include dynamically electronically linking—such as via a Uniform Resource Locator [URL]) 936 to the user's blockchain identity or address 932. This due to the blockchain address 932 being mathematically generated from the public key that is part of the NeoTrust ID 912.

Figure 2:
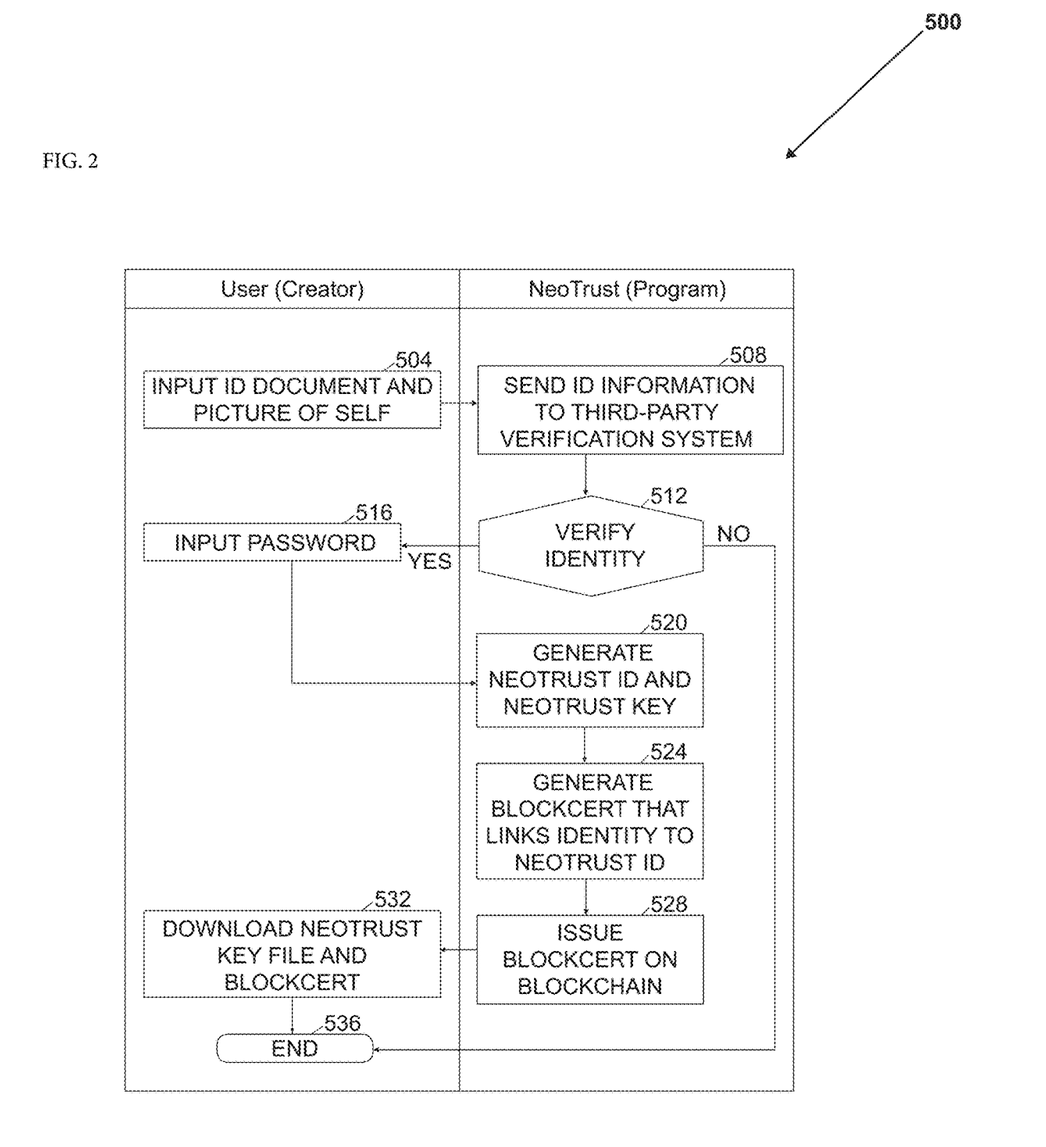
FIG. 2 presents an exemplary flow of creating a NeoTrust ID.

The user must obtain 500 a NeoTrust ID 912 by inputting 504 into the NeoTrust program a scan of the user's government issued identity document (ie. driver's license, passport, state ID card) as well as a picture of the user's own face (selfie) taken at that time. The NeoTrust program then sends 508 this information to a trusted third party identity verification system in order to verify 512 that the submitted identity document is legitimate and that the user is in fact the person described in the identity document. This third party verification system will use software to determine the legitimacy of the submitted identity document and will determine whether the selfie was taken at that current time as well as if the selfie matches the image in the identity document.

If 512 a response from the trusted third party identity verification system indicating that the user's identity 916 was successfully verified is received by the NeoTrust program, it will request that the user create and input 516 a password for key encryption. The NeoTrust program then generates 520 a NeoTrust ID 912 and corresponding NeoTrust Key 904.

The NeoTrust Key 904 is a keystore file that is a password encrypted version of the NeoTrust ID 912. It is provided to the user as a more secure means to access 908 their NeoTrust ID 912, as opposed to saving the unencrypted NeoTrust ID 912 private key. In this way, if a nefarious party got ahold of the NeoTrust Key 904, they would still require the password to access 908 the associated NeoTrust ID 912 and would therefore not be able to forge a recorded NeoTrust archive file 944.

The NeoTrust program then generates 524 a digital certificate called a BlockCert 924 which contains information regarding the user's identity 916 (ie. user full name) and issues 528 it to the user's NeoTrust ID 912 linked 936 blockchain address 932 in the form of a blockchain transaction. The BlockCert 924 serves as a link 920 to the user's real world identity 916 and a link 928 to the user's NeoTrust ID 912. The blockchain transaction is sent from the NeoTrust program's blockchain address to the user's NeoTrust ID 912 linked 936 blockchain address 932 so that verification of the issuer (ie. the NeoTrust Program) and the recipient (ie. the NeoTrust user) is possible. This transaction also stores as meta-data the SHA256 digest of the entire BlockCert 924, as generated by the NeoTrust program. Issuing the BlockCert 924 in this manner provides an immutable record linking the BlockCert 924 (ie. the user's real world identity 916) to the user's NeoTrust ID 912 linked 936 blockchain address 932.

The user should download and securely store 532 the NeoTrust Key 904 and BlockCert 924 on a local device and keep the NeoTrust Key 904 private. At this point, the process of creating a NeoTrust ID is complete 536.

Figure 7:
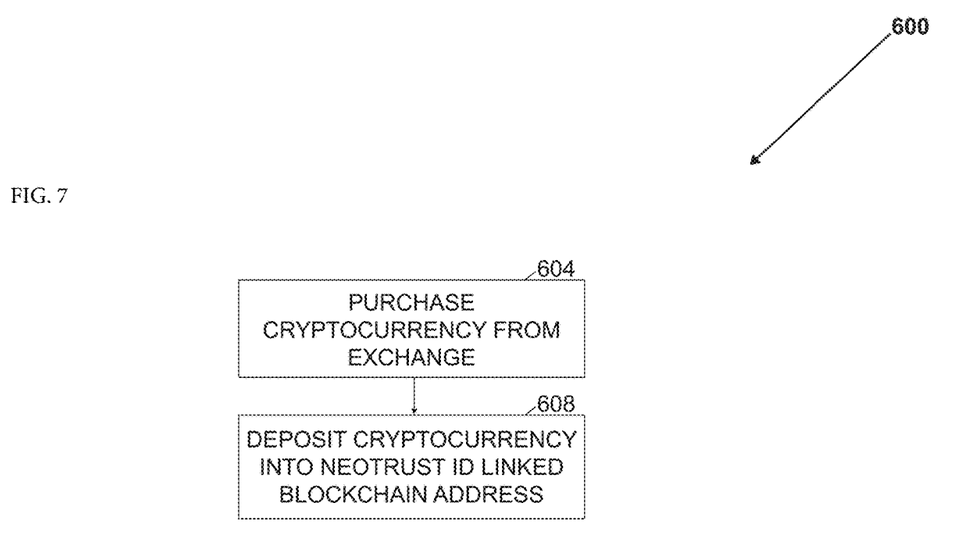
FIG. 7 presents an exemplary flow of NeoTrust ID use.

Once the user has obtained their NeoTrust ID 912 and NeoTrust Key 904, they must load 600 their NeoTrust ID 912 linked 936 blockchain address 932 with funds in order to create and record NeoTrust archive files 944. This is because public blockchains, such as Ethereum and Bitcoin, require funds to send transactions, and the data that must be recorded for verification purposes is held in such a transaction. To load their blockchain address 932 with funds, the user must contact a cryptocurrency exchange and purchase the appropriate cryptocurrency 604, depending on which blockchain the embodiment in question uses. The cryptocurrency must then be deposited 608 into the user's NeoTrust linked 936 blockchain address 932 in order for it to be accessible for recording NeoTrust archive related data on the blockchain.

Figure 3:
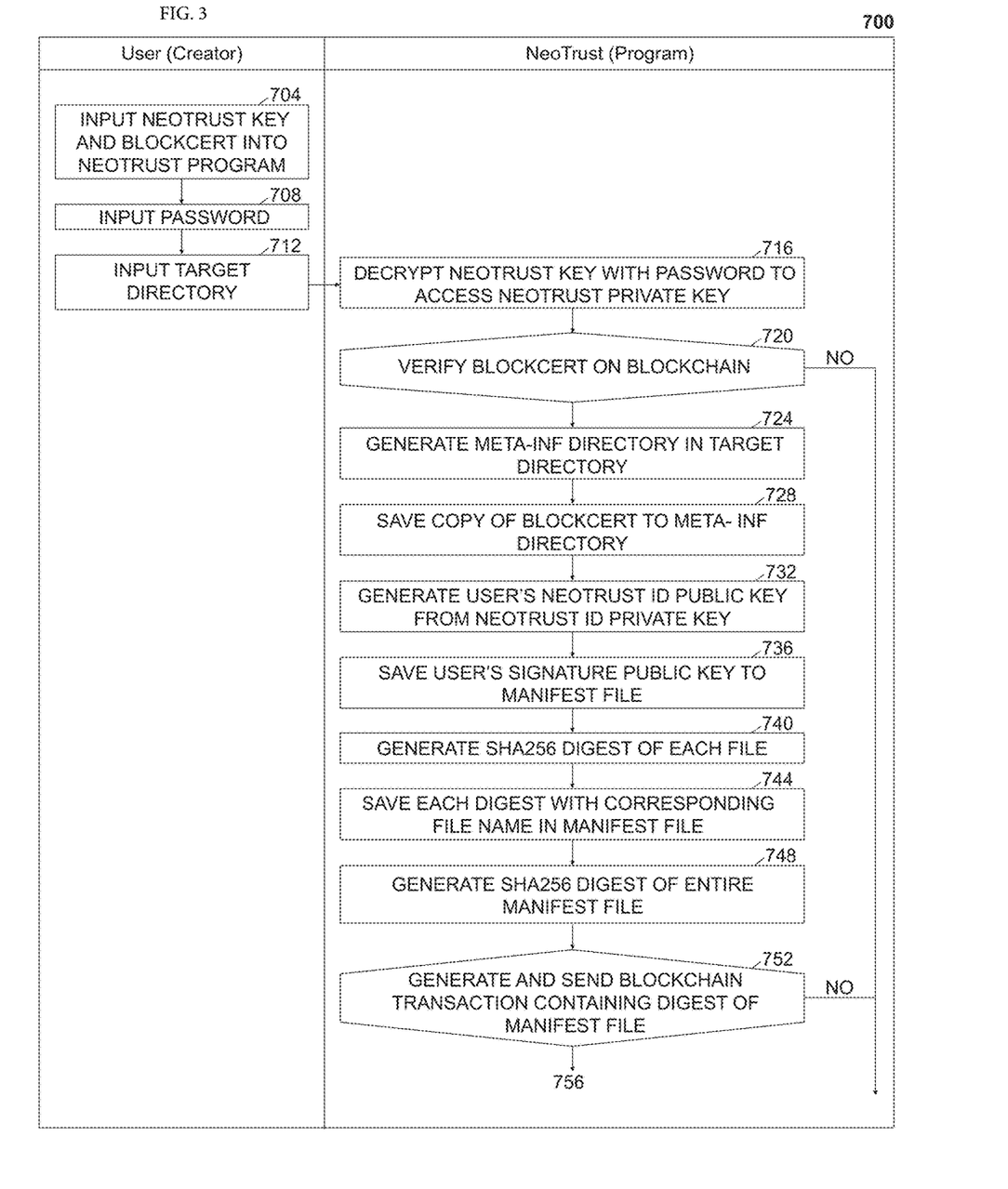
FIG. 3 presents an exemplary flow of creating a NeoTrust file.

Once the proper funds have been deposited into the user's NeoTrust ID 912 linked 936 blockchain address 932, the user has the ability to create 700 a NeoTrust archive file 944 and record all verification related information on the blockchain using their NeoTrust ID 912 with the NeoTrust program. In the first step of this process, the user inputs 704 their NeoTrust Key 904 and BlockCert 924. The NeoTrust Key 904 is required to access the user's NeoTrust ID 912 and the BlockCert 924 is required to provide proof of their identity 916 to any parties that would verify the created Neotrust.

The user then inputs 708 their password which allows the NeoTrust program to decrypt 716 the NeoTrust Key 904 and generate the private key (ie. the private portion of the NeoTrust ID 912). Accessing the NeoTrust ID 912 enables the functionality to create and record a NeoTrust archive file 944. The target directory (ie. the file or set of files that the user would like to generate a NeoTrust archive file 944 from) is then inputted 712 into the NeoTrust program. Any type of file format can be in the target directory including video files 944A, computer code files 944B, image files 944C, digital certificates 944D, audio files 944E, and more.

The NeoTrust program then verifies 720 the user inputted BlockCert 924 on the blockchain to ensure that the NeoTrust program issued the BlockCert 924 and that it is in the exact same state as when it was issued. This is accomplished by the NeoTrust program generating a SHA256 digest of the user inputted BlockCert 924 and comparing this digest against the digest recorded in the blockchain transaction of the BlockCert 924 issuance. If 720 the NeoTrust Program was able to successfully verify the BlockCert 924, the NeoTrust program generates 724 a directory named "META-INF" within the user inputted target directory.

The "META-INF" directory will hold all the meta-information files that allow for verification of the NeoTrust archive file 944. The NeoTrust program generates 728 a copy of the user inputted BlockCert 924 and saves it within the "META-INF" directory. This ensures that the certificate, and thus the identity 916 of the user that created the NeoTrust archive file 944, is verifiable. The NeoTrust program then generates 732 the public key portion of the user's NeoTrust ID 912 from the private key portion and saves 736 it to a newly created manifest file within the "META-INF" directory.

Figure 4:
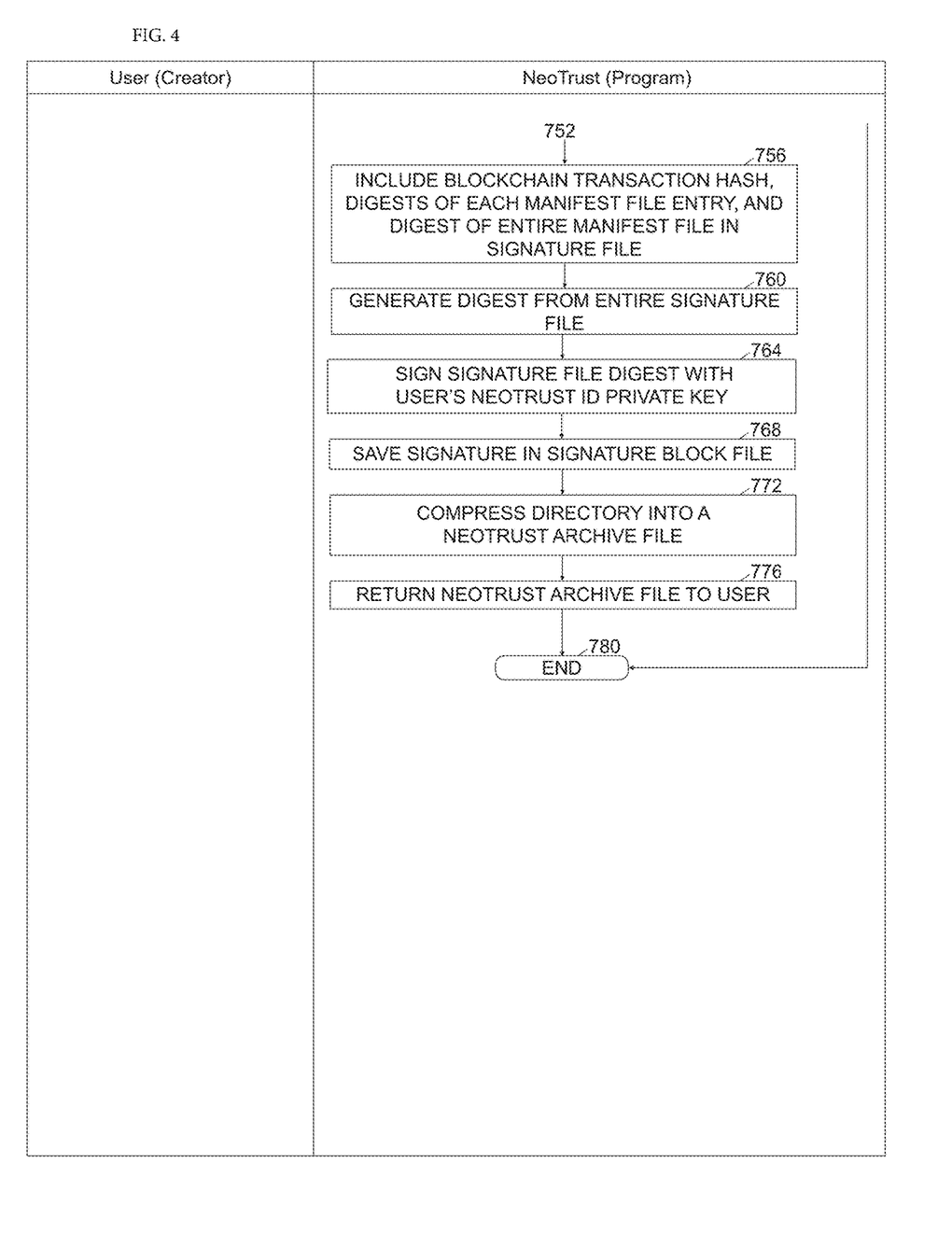
FIG. 4 presents an exemplary flow of creating a NeoTrust file.

To record the state of the digital content being converted into a NeoTrust archive file 944, the NeoTrust program generates 740 a SHA256 digest for each file contained within the user inputted target directory and saves 744 each digest along with the corresponding file name as entries in the manifest file. The NeoTrust program then generates 748 a SHA256 digest of the entire manifest file. The manifest file digest serves as a digest that is representative of all of the file contents within the user inputted target directory. If anything changes in the content of any of the files, the manifest file digest will be different.

The NeoTrust program then creates and sends 752 a blockchain transaction containing the manifest file digest from the user's NeoTrust ID 912 linked 936 blockchain address 932. The manifest file digest is held in the meta-data portion of the blockchain transaction. The NeoTrust program includes 756 the previously sent blockchain transaction hash, SHA256 digests for each manifest file entry, and the digest of the entire manifest file in the signature file. The signature file serves as a receptacle for all metadata collected for the NeoTrust archive file 944 creation and recording process up to this point. It links together the target file structure, target file names, target file digests, blockchain transaction so that the state of each of those elements can be saved into one file.

The NeoTrust program then generates 760 a SHA256 digest of the entire signature file, thus solidifying in code the state of the previously mentioned elements. The NeoTrust program then uses the private key portion of the user's NeoTrust ID 912 to sign 764 the digest of the entire signature file, producing a digital signature. This digital signature is saved 768 to a newly created signature block file in the META-INF directory. The signature block file provides verifiable proof that all of the previously mentioned elements have not been altered after the creation of a NeoTrust Archive file 944. The NeoTrust program then compresses 772 the target directory, which now includes a META-INF directory, into a NeoTrust archive file 944 and returns 776 this file to the user. At this point, the process of creating and recording a NeoTrust archive file 944 is complete 780.

Figure 5:
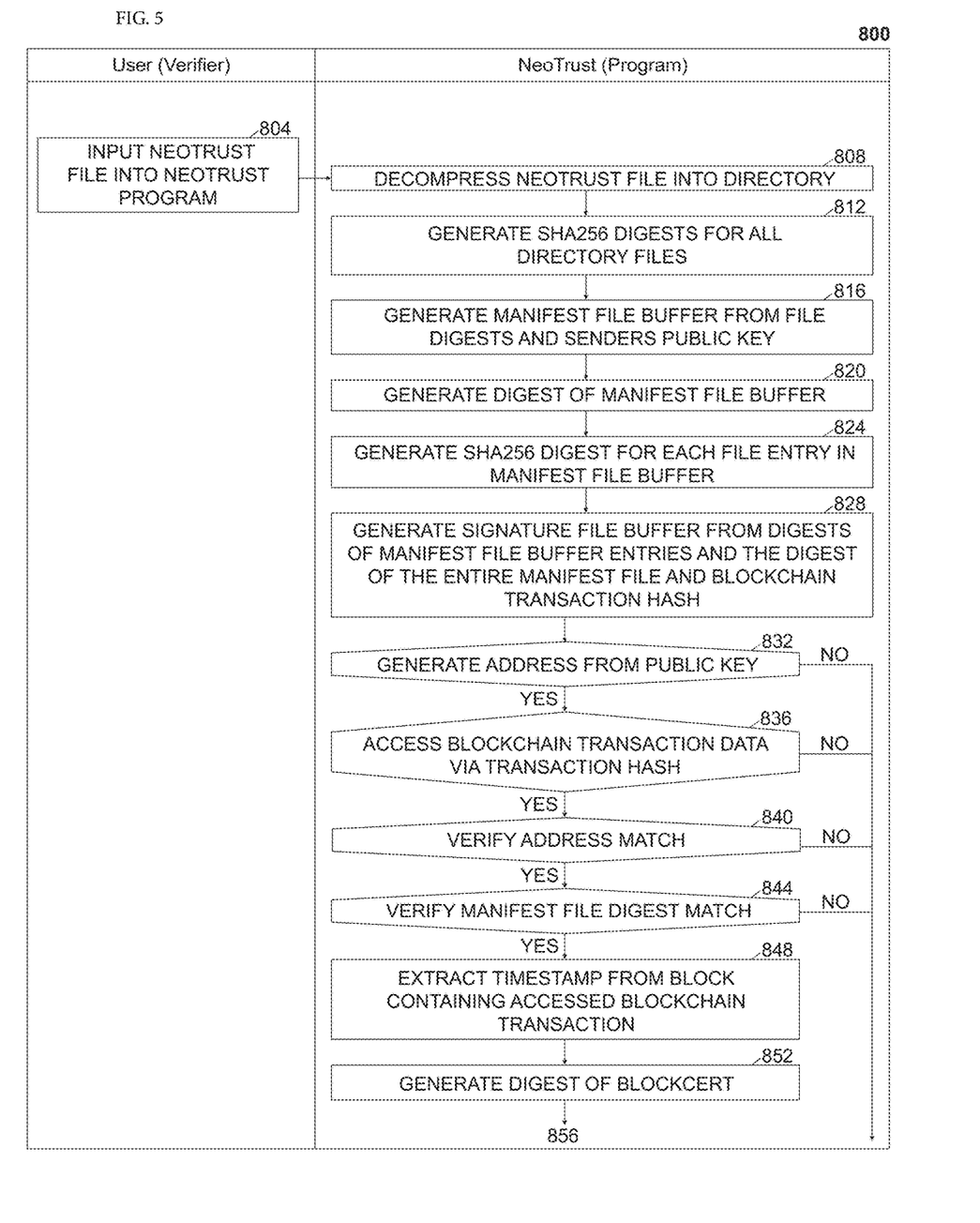
FIG. 5 presents an exemplary flow of creating a NeoTrust Verification.

Once the NeoTrust archive file 944 creation and recording process is complete, the files no-later-than date-of-existence, data integrity, identity 916 of the recorder, and timestamp of the recording can be verified 800. Verification of a NeoTrust archive file 944 does not require the verifying user to have a NeoTrust ID 912 nor does it require any transfer of funds.

To verify 800 a NeoTrust archive file 944, a user first inputs 804 the NeoTrust archive file 944 they would like to verify into the NeoTrust program. The NeoTrust program decompresses 808 the NeoTrust archive file 944 in a file directory. The NeoTrust program then generates 812 SHA256 digests for all files within the decompressed directory. This is the first step to ensuring that no changes have been made to the NeoTrust archive file 944 being verified after it was signed by the creator of that NeoTrust archive file 944.

The NeoTrust program then generates 816 a manifest file that is held in a buffer in memory. This manifest file buffer includes entries for each SHA256 digest generated from the files in the archive directory along with the corresponding file names. It also includes the public key, found in the original manifest file of the NeoTrust archive, of the user that created the NeoTrust archive file 944 being verified.

The NeoTrust program then generates 820 a SHA256 digest for the entire manifest file buffer and generates 824 SHA256 digests for each file entry in the manifest file buffer. A signature file is then generated 828 that is held in a buffer in memory. This signature file buffer includes entries for each SHA256 digest generated from the manifest file buffer entries along with the corresponding file names. It also includes the hash of the blockchain transaction associated with the NeoTrust archive file 944 being verified. This blockchain transaction hash is copied from the original signature file included in the NeoTrust archive file 944.

The NeoTrust program then generates 832 the NeoTrust archive file 944 creator's blockchain address 932 from the public key provided in the original manifest file of the NeoTrust archive. The blockchain transaction is then accessed 836 via transaction hash. The blockchain address 932 generated 832 is then compared to the blockchain address that sent the blockchain transaction.

If 832 both blockchain addresses match, it lends proof that the person who sent the NeoTrust archive is in fact who they claim to be and the verification process 800 moves on to verify 840 that the SHA256 digest generated from the manifest file buffer matches the SHA256 digest held in the blockchain transaction meta-data. If 840 the digests match, it lends proof that the content and structure of the files contained in the NeoTrust archive have not been altered since creation and the verification process 800 moves on to the next step.

Figure 6:
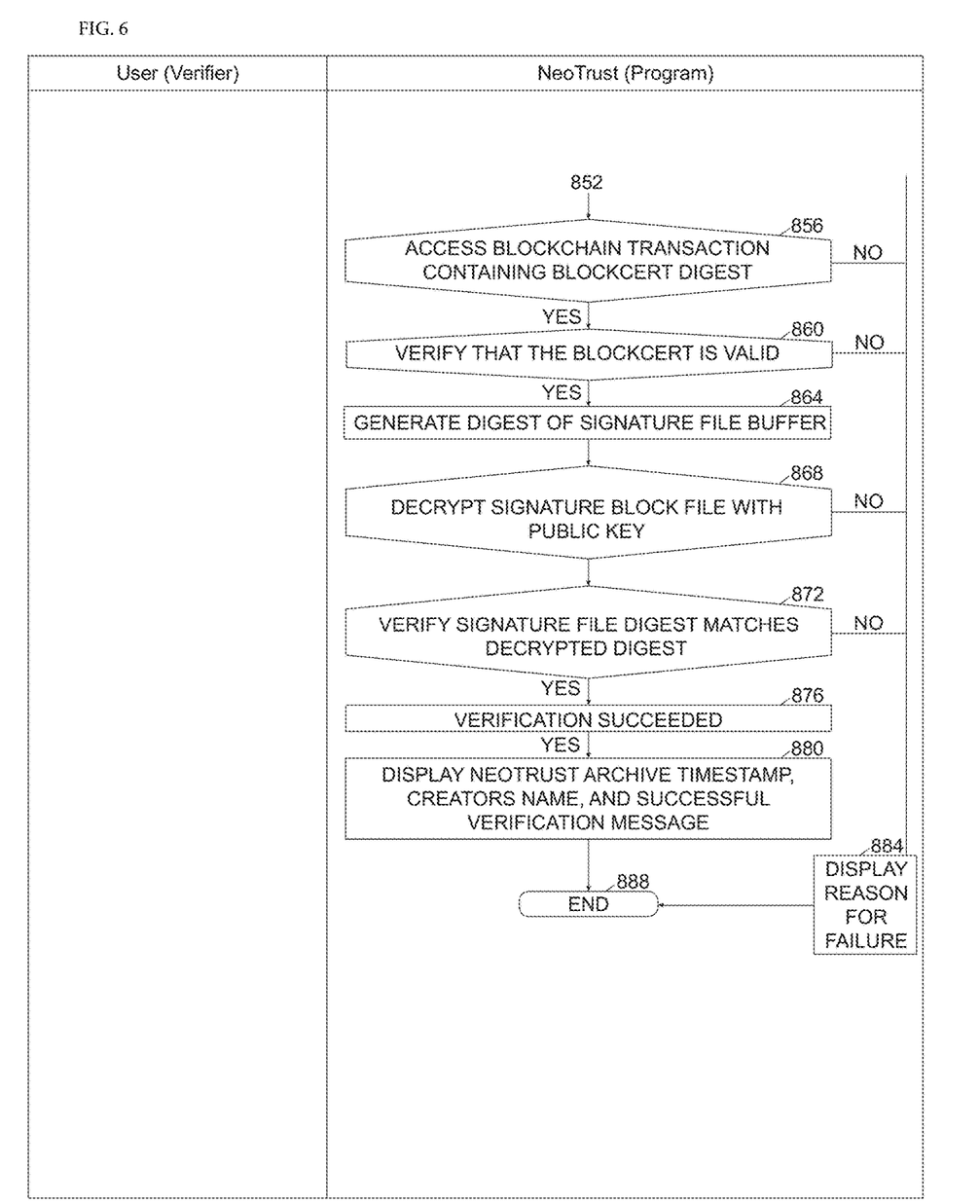
FIG. 6 presents an exemplary flow of creating a NeoTrust Verification.

However, with the verification measure put forth thus far, there is a risk that a malicious actor has altered the blockchain transaction hash contained in the signature file of the NeoTrust archive. Altering the blockchain transaction hash in such a way allows it to reference a falsified blockchain transaction that could return a falsified timestamp, that is, a falsified no-later-than date-of-existence for the NeoTrust archive file 944. This risk is handled in a later step 872 of the NeoTrust archive file 944 verification process 800.

Once the NeoTrust program determines that manifest file digest buffer matches the manifest file digest held in the blockchain transaction, the verification process 800 moves on to extract 848 and store the timestamp of the block in the blockchain that contains the transaction. The timestamp must be taken from the block rather than the transaction itself because blockchain transactions do not have timestamps. Due to this, there will be a time difference, the length of which is dependent on the traffic of the blockchain network at that time, between the time of actual creation of the NeoTrust archive file 944 and the timestamp that is used for the NeoTrust archive file 944 no-later-than date-of-existence. As the timestamp of the block that contains the NeoTrust archive blockchain transaction will always be later than the actual time of creation, the timestamp still serves as a valid no-later-than date-of-existence for the NeoTrust archive file 944.

The NeoTrust program then generates 852 a SHA256 digest of the BlockCert 924 contained in the NeoTrust archive. The digest of the BlockCert 924 is held in a buffer in memory. The NeoTrust program then accesses 856 the blockchain transaction that holds the original SHA256 digest of the BlockCert 924 to compare the generated digest with the digest held in the transaction. The blockchain transaction being checked was created and sent when the BlockCert 924 was originally issued 528 to the user that created the NeoTrust archive file 944 being verified. If 860 both BlockCert 924 digests match, it lends proof that the user who sent the NeoTrust archive is in fact who they claim to be and the verification process 800 moves on. A verified 860 BlockCert 924 combined with a verified 840 creator blockchain address 932 provide complete proof that the sender of the NeoTrust archive file 944 is in fact who they claim to be.

Once it is determined that the generated BlockCert 924 digest matches the BlockCert 924 digest held in the blockchain transaction, the verification process 800 moves on to generate 864 a SHA256 digest of the signature file buffer that was generated earlier in the process. The signature block file contained in the NeoTrust archive is then decrypted 868 using the public key of the user that created the NeoTrust archive file 944. The public key is found in the manifest file in the NeoTrust archive.

The NeoTrust program then verifies 872 that the digest resulting from decrypting 868 the signature block file matches the digest of the signature file buffer generated earlier in the verification process. If 872 both digests match, it lends proof that the content and structure of the files in the NeoTrust archive has not been altered since creation of the NeoTrust archive file 944 and that the blockchain transaction hash contained in the manifest file has not been altered.

At this point, the verification process of the NeoTrust archive file 944 is considered to have succeeded 876. The no-later-than date-of-existence and the identity 916 information of the signer is then displayed 880 to the user, along with a message stating that verification has succeeded. The NeoTrust archive verification process then ends 888.

The invention claimed is:

1. A method to record data integrity, identity of a user, and no-later-than date-of-existence of digital content, the method comprising:

verifying the identity of the user, by sending information including at least the user's government issued identity document to a trusted 3rd party identity verification system;

verifying the identity of the user on a blockchain using a digital certificate presented as a BlockCert;

generating the user's secp256k1 public/private key pair termed as a "NeoTrust ID";

generating a keystore file that contains a password encrypted sec 256k1 private key portion of the NeoTrust ID;

generating a blockchain address from the secp256k1 public key;

generating SHA256 digests for each file in the work of digital content;

generating meta-information files for the digital content, wherein the meta-information files are located in a subdirectory named "META-INF" and include a digital content manifest file, signature file, and signature block file, wherein the digital content manifest file contains the secp256k1 public key of the user and the SHA256 digests of each file contained in the digital content with file name listed in a determinate order, and wherein the signature file contains a SHA256 digest of the digital content manifest file, a SHA256 digest of each entry in the digital content manifest file along with the corresponding file name listed in the determinate order, and a transaction hash of a blockchain transaction that holds a Digital content manifest file digest, and wherein the signature block file contains a digital signature resulting from digitally signing a SHA256 digest of the entire signature file with the user's secp256k1 private key portion of the NeoTrust ID;

recording the SHA256 digest of the digital content manifest file in a blockchain transaction;

compressing digital content files along with the generated digital content meta-information files into a NeoTrust archive file;

decompressing the NeoTrust archive file into a directory of files containing the digital content files and the digital content meta-information files, wherein the meta-information files are located in the subdirectory named "META-INF" and include the digital content manifest file, signature file, and signature block file, wherein the digital content manifest file contains the secp256k1 public key of the user and the SHA256 digests of each file contained in the digital content with the file name listed in the determinate order, and wherein the signature file contains the SHA256 digest of the digital content manifest file, the SHA256 digest of each entry in the digital content manifest file along with the corresponding file name listed in the determinate order, and the transaction hash of the blockchain transaction that holds the Digital content manifest file digest, and wherein the signature block file contains the digital signature resulting from digitally signing the SHA256 digest of the entire signature file with the user's secp256k1 private key;

verifying that the NeoTrust manifest file SHA256 digest matches the digital content manifest file SHA256 digest found in the corresponding blockchain transaction;

verifying that the blockchain address of a user who created the NeoTrust archive file matches the blockchain address that sent the blockchain transaction corresponding to that NeoTrust archive file;

generating a SHA256 digest of the BlockCert contained in the NeoTrust archive file;

verifying that the BlockCert is valid by comparing its SHA256 digest to the SHA256 digest contained in the corresponding blockchain transaction;

decrypting the digital signature held in the signature block file contained in the NeoTrust archive file;

verifying that a given digital signature matches another digital signature;

displaying the NeoTrust archive file no-later-than date-of-existence;

displaying the NeoTrust archive file user name.

2. A system to record data integrity, identity of a user, and no-later-than date-of-existence of digital content, the system comprising:

a memory;

and a hardware processor that, when executing computer executable instructions stored in the memory, is configured to:

verify the identity of the user, by sending information including at least the user's government issued identity document to a trusted 3rd party identity verification system;

verify the identity of the user on a blockchain using a digital presented as a BlockCert;

generate the user's secp256k1 public/private key pair termed as a "NeoTrust ID";

generate a keystore file that contains a password encrypted secp256k1 private key portion of the NeoTrust ID;

generate a blockchain address from the secp256k1 public key;

generate SHA256 digests for each file in the work of digital content;

generate meta-information files for the digital content, wherein the meta-information files are located in a subdirectory named "META-INF" and include a digital content manifest file, signature file, and signature block file, wherein the digital content manifest file contains the secp256k1 public key of the user and the SHA256 digests of each file contained in the digital content with file name listed in a determinate order, and wherein the signature file contains a SHA256 digest of the digital content manifest file, a SHA256 digest of each entry in the digital content manifest file along with the corresponding file name listed in the determinate order, and a transaction hash of a blockchain transaction that holds a Digital content manifest file digest, and wherein the signature block file contains a digital signature resulting from digitally signing a SHA256 digest of the entire signature file with the user's secp256k1 private key portion of the NeoTrust ID;

record the SHA256 digest of the digital content manifest file in a blockchain transaction;

compress digital content files along with the generated digital content meta-information files into a NeoTrust archive file;

decompress the NeoTrust archive file into a directory of files containing the digital content files and the digital content meta-information files, wherein the meta-information files are located in the subdirectory named "META-INF" and include the digital content manifest file, signature file, and signature block file, wherein the digital content manifest file contains the secp256k1 public key of the user and the SHA256 digests of each file contained in the digital content with the file name listed in the determinate order, and wherein the signature file contains the SHA256 digest of the digital content manifest file, the SHA256 digest of each entry in the digital content manifest file along with the corresponding file name listed in the determinate order, and the transaction hash of the blockchain transaction that holds the Digital content manifest file digest, and wherein the signature block file contains the digital signature resulting from digitally signing the SHA256 digest of the entire signature file with the user's secp256k1 private key;

verify that the NeoTrust manifest file SHA256 digest matches the digital content manifest file SHA256 digest found in the corresponding blockchain transaction;

verify that the blockchain address of a user who created the NeoTrust archive file matches the blockchain address that sent the blockchain transaction corresponding to that NeoTrust archive file;

generate a SHA256 digest of the BlockCert contained in the NeoTrust archive file;

verify that the BlockCert is valid by comparing its SHA256 digest to the SHA256 digest contained in the corresponding blockchain transaction;

decrypt the digital signature held in the signature block file contained in the NeoTrust archive file;

verify that a given digital signature matches another digital signature;

display the NeoTrust archive file no-later-than date-of-existence;

display the NeoTrust archive file user name.

* * * * *